United States Patent
Soulchin et al.

(10) Patent No.: US 8,405,520 B2
(45) Date of Patent: Mar. 26, 2013

(54) TRAFFIC DISPLAY DEPICTING VIEW OF TRAFFIC FROM WITHIN A VEHICLE

(75) Inventors: Robert M. Soulchin, King of Prussia, PA (US); Howard M. Swope, III, Exton, PA (US); Michal Balcerzak, Philadelphia, PA (US)

(73) Assignee: Navteq B.V., Veldhoven (NL)

( * ) Notice: Subject to any disclaimer, the term of this patent is extended or adjusted under 35 U.S.C. 154(b) by 509 days.

(21) Appl. No.: 12/254,212

(22) Filed: Oct. 20, 2008

(65) Prior Publication Data

US 2010/0097240 A1    Apr. 22, 2010

(51) Int. Cl.
*G08G 1/09* (2006.01)
(52) U.S. Cl. ............... 340/905; 340/995.1; 345/419; 382/104
(58) Field of Classification Search ............ 340/905; 345/418
See application file for complete search history.

(56) References Cited

U.S. PATENT DOCUMENTS

| 4,190,832 | A * | 2/1980 | Mohler | 345/7 |
| 6,476,802 | B1* | 11/2002 | Rose et al. | 345/419 |
| 7,116,326 | B2 | 10/2006 | Soulchin et al. | 345/440 |
| 2002/0130953 | A1* | 9/2002 | Riconda et al. | 348/115 |
| 2003/0151677 | A1* | 8/2003 | Obradovich | 348/231.3 |
| 2004/0143385 | A1 | 7/2004 | Smyth et al. | 701/117 |
| 2006/0247850 | A1 | 11/2006 | Cera et al. | 701/208 |
| 2009/0243824 | A1* | 10/2009 | Peterson et al. | 340/435 |

* cited by examiner

*Primary Examiner* — Daniel Wu
*Assistant Examiner* — Frederick Ott

(57) ABSTRACT

A method and system for displaying an in-car view of current traffic conditions is disclosed. A user can select an "In Car View" as a display option. A display shows traffic conditions from a driver's eye view. A forward view depicts a vehicle dashboard, which may include a steering wheel, a central column, gauges, a rear view mirror, and a windshield. Graphics representing traffic conditions are visible through the windshield of the forward view. A side view allows a user to see traffic conditions on the opposite side of the road. The in-car view moves at a rate associated with the pace of the current traffic conditions.

22 Claims, 7 Drawing Sheets

TRAFFIC DISPLAY DEPICTING VIEW OF TRAFFIC FROM WITHIN A VEHICLE

FIELD

The present invention relates generally to providing a display of current traffic conditions, and more particularly, relates to an in-car view of current traffic conditions.

BACKGROUND

Most drivers have been impacted by traffic delays. Traffic delays are caused by one or more traffic incidents, such as congestion, construction, an accident, a special event (e.g., concerts, sporting events, festivals), a weather condition (e.g., rain, snow, tornado), and so on. Many television stations provide a traffic report in their news reports to provide viewers with information regarding current traffic conditions. Some television stations use graphics when presenting traffic information.

For example, U.S. Pat. No. 7,116,326, which is assigned to the same assignee of the present application, describes how a television station can display a traffic flow map that visually shows an animated graphic of the traffic conditions on one or more roadways in and around a metropolitan area. The traffic flow map is automatically generated from real or near real time traffic flow data, and continually changes as the actual, current traffic conditions change.

The television station may provide different views of the animated traffic flow. For example, U.S. Patent Publication No. 2006/0247850, which is assigned to the same assignee of the present application, describes three different views: a two-dimensional (2D) overhead map, a Skyview map, and a three-dimensional (3D) fly-through map. The 2D overhead map depicts traffic conditions from the perspective of a viewer looking down at a map. The Skyview map is a 3D representation that includes buildings, terrain, and other landmarks. Similar to the 2D overhead map, the Skyview map depicts traffic conditions from the perspective of a viewer looking down at a map. The 3D fly-through map is a dynamic presentation of a 3D world detailing traffic conditions along a selected roadway or series of roadways.

While these views allow a user to more easily comprehend the current traffic conditions, there continues to be room for new features and improvements in providing traffic reports. One area for improvement is providing a traffic view that allows the viewer to "experience" the traffic. By providing a first person perspective from the inside of a vehicle, viewers of the traffic report may comprehend the current traffic conditions more easily.

SUMMARY

A method and system for displaying an in-car view of current traffic conditions is disclosed. The in-car view is a first person perspective from inside of a vehicle showing traffic conditions from a driver's eye view. A forward view depicts a vehicle dashboard, which may include a steering wheel, a central column, gauges, a rear view mirror, and a windshield. A side view depicts a vehicle window through which a driver can see the traffic conditions on an opposite side of the road. A rear view depicts traffic conditions as seen by a driver looking at a rear view mirror.

The in-car view may also display traffic condition or route data on a screen element within the view. The screen element may represent a navigation system display or any other type of display. For example, speed, travel time, and other text and graphics may be presented on the screen element. As another example, camera video may be presented on the screen element. A user, such as a television producer, may vary the manner in which the data is presented on the screen element. For example, the user may use a zoom feature to increase or decrease the size and location of the data presented on the screen element.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
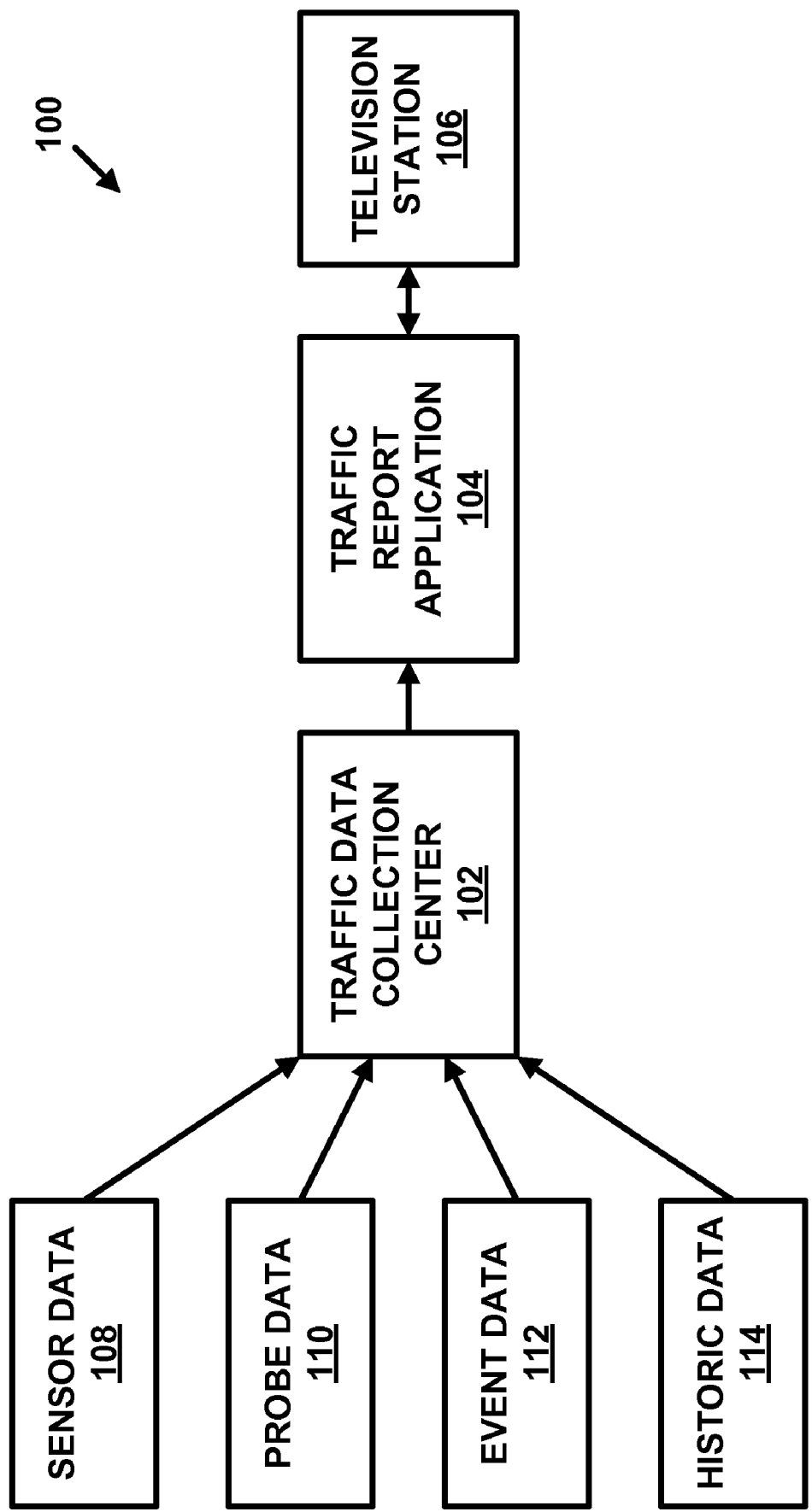
FIG. 1 is a block diagram of a system that may be used to display an in-car view of current traffic conditions, according to an example.

FIG. 1 is a block diagram of a system 100 that may be used to display an in-car view of current traffic conditions. The system 100 includes a traffic data collection center 102 and a traffic report application 104. The traffic data collection center 102 receives data regarding traffic conditions from a variety of sources and provides a traffic data output to the traffic report application 104. The traffic report application 104 uses the traffic data output along with user inputs to generate a video output that can be used by a television station 106 or other end user, such as a web-based or cellular-based application, to present information regarding current traffic conditions to viewers.

The traffic data collection center 102 receives sensor data 108, probe data 110, and/or event data 112. The sensor data 108 is data collected from roadway sensors. The sensors may use radar, acoustics, video, and embedded loops in the roadway to collect data that can be used to characterize traffic conditions. For example, the sensor data 108 may include speed, volume (number of vehicles passing the sensor per period of time), and density (percentage of the roadway that is occupied by vehicles). The sensor data 108 may include other data types as well, such as vehicle classification (car, truck, motorcycle). The sensor data 108 is generally collected in real time (i.e., as it occurs) or at near real time.

The probe data 110 is point data collected from a moving vehicle having a device that can identify vehicle position as a vehicle travels along a road network. For example, the device may use cellular technology or Global Positioning Satellite (GPS) technology to monitor the vehicle's position on the road network. By monitoring the vehicle's movement, the probe data 110 can be used to determine travel time, which can then be used to calculate speed of the vehicle. The probe data 110 is generally collected in real time or at near real time.

The event data 112 is traffic data regarding a traffic event. A traffic event is an occurrence on a road system that may impact the flow of traffic. Traffic events include incidents and weather. An incident is a traffic event that obstructs the flow of traffic on the road system or is otherwise noteworthy in reference to traffic. Example incidents include accidents, congestion, construction, disabled vehicles, and vehicle fires.

A traffic operator may enter the event data 112 into a Traffic Incident Management System (TIMS), such as the TIMS described in U.S. Patent Publication No. 2004/0143385, which is assigned to the same assignee as the current application. U.S. Patent Publication No. 2004/0143385 is hereby incorporated by reference in its entirety. A traffic operator is a person who gathers traffic information from a variety of sources, such as by monitoring emergency scanner frequencies, by viewing images from cameras located adjacent to a roadway, and by calling government departments of transportation, police, and emergency services. In addition, the traffic operator may obtain traffic data from aircraft flying over the road network.

The traffic operator may enter event data 112 using TIMS edit screens, which present the traffic operator with a menu to select the type of information entered for a particular type of incident. The TIMS uses a series of forms to prompt the traffic operator for relevant information to be entered. The forms and fields used depend on the type of traffic information to be entered and what type of information is available. For example, the traffic information entered by the traffic operator may be related to weather, an accident, construction, or other traffic incident information.

The traffic data collection center 102 may also have access to historical traffic data 114. The historical traffic data 114 may include travel time, delay time, speed, and congestion data for various times of the day and days of the week. The traffic data collection center 102 may use the historical traffic data 114 to predict clearance time for a traffic event, to predict traffic conditions when sensor data 108, probe data 110, and/or event data 112 is unavailable for a particular roadway, or for any other suitable purpose.

The traffic data collection center 102 includes a combination of hardware, software, and/or firmware that collects the received sensor, probe, event, and historical traffic data 108-114, analyzes the data 108-114, and provides a traffic data output to applications that use traffic data. For example, the traffic data collection center 102 may be a virtual geo-spatial traffic network (VGSTN) as described in U.S. Patent Publication No. 2004/0143385. Other systems for collecting, analyzing, and providing traffic data in a format that can be used by applications may also be used.

The traffic data collection center 102 analyzes sensor data 108 and probe data 110 to determine whether congestion is building, steady, or receding on a roadway. Additionally, the traffic data collection center 102 integrates the sensor data 108 and probe data 110 with the collected event data 112. The integrated data is mapped using a geographic database to produce a virtual traffic network representing traffic conditions on a road network. In one embodiment, the geographic database is a geographic database published by NAVTEQ North America, LLC of Chicago, Ill.

The traffic data collection center 102 provides a traffic data output to the traffic report application 104. The traffic data output may be a traffic feed, such as an RSS or XML feed. The traffic report application 104 uses the traffic data output and inputs from a user to create a video output for a traffic report that can be used by the television station 106. For example, the traffic report application 104 may be the NeXgen television traffic reporting application as described in U.S. Patent Publication No. 2006/0247850, which is hereby incorporated by reference in its entirety. Other applications that can create a traffic report using traffic data may also be used.

The NeXgen application uses the traffic data output to create data-driven maps and informational graphics of traffic conditions on a road system for display on a video device. With the NeXgen application, traffic maps and informational graphics do not need to be pre-rendered into movies, thus providing a dynamic view of traffic data on a road system. Specifically, 2D and 3D traffic maps and informational graphics change as traffic data changes in real or near real time. Also, with the NeXgen application, the traffic report is dynamically created to illustrate the traffic data that the user selects.

While the traffic report application 104 is depicted in FIG. 1 as a stand-alone entity, it is understood that the traffic report application 104 may be co-located with either the traffic data collection center 102 or the television station 106. Additionally, the output from the traffic report application 104 may be provided to end users other than the television station 106. For example, the traffic report application 104 may provide an output to a web-based application or a cellular application.

Figure 2:
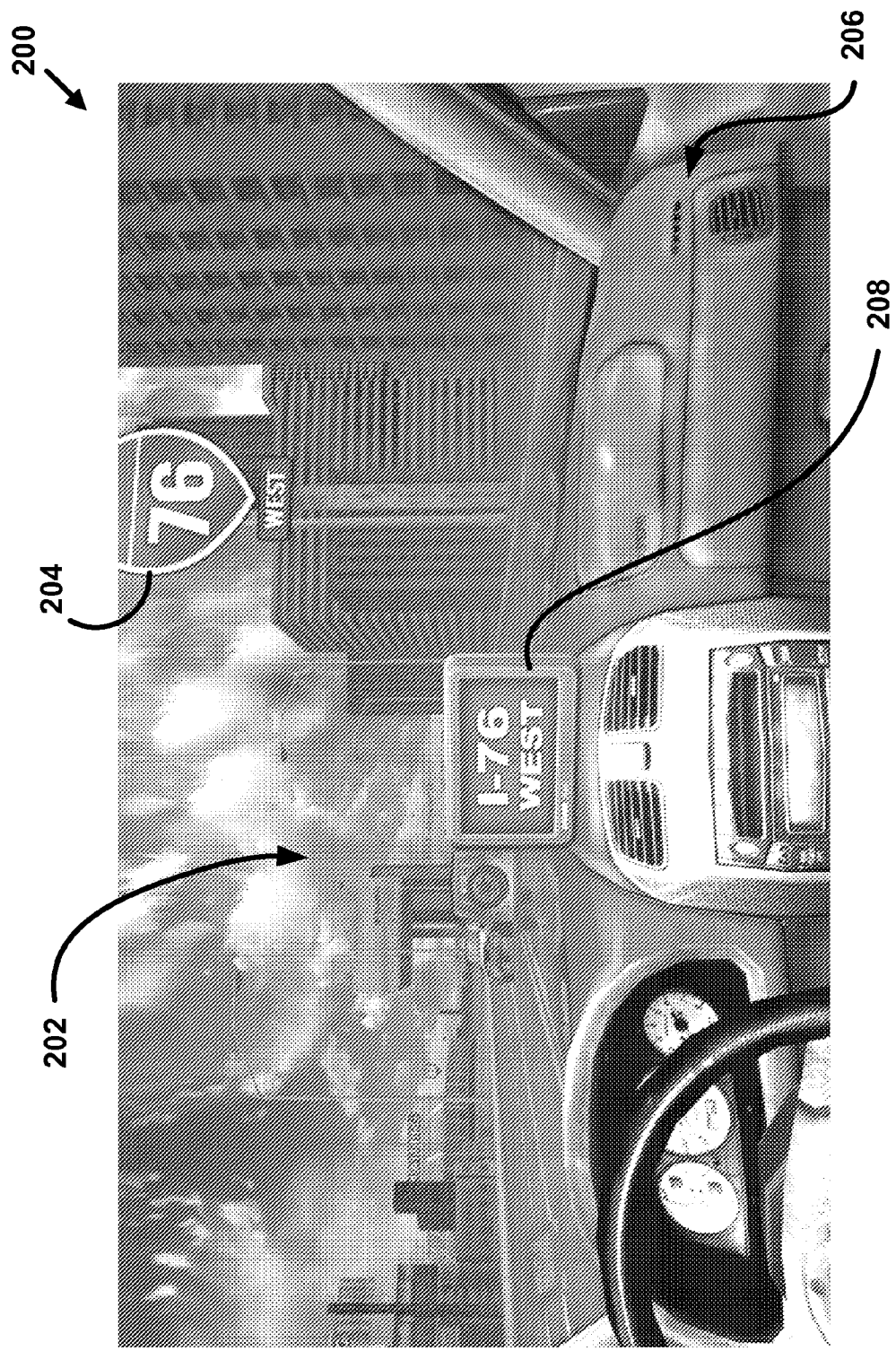
FIG. 2 is screen shot depicting a forward in-car view of current traffic conditions, according to an example.

FIG. 2 is screen shot 200 depicting a forward in-car view of current traffic conditions. The screen shot 200 is an example of a single image from a traffic report that may be generated by the traffic report application 104 and presented by the television station 106.

The screen shot 200 shows traffic conditions 202 that are located ahead from a driver's eye view. The traffic conditions 202 may be represented by a traffic flow map, preferably using a color-coded animation of vehicles moving along a roadway. The animation is representative of the current speed, volume, and density of the current traffic conditions along the roadway. For example, cars depicted on a segment of the traffic flow map may move at a rate representative of the actual roadway speed for the segment. Additionally, the number of cars may represent the actual volume of cars on the segment and the color of the cars may represent the actual density of the segment.

The screen shot 200 also shows graphic objects 204 that are added to the view to help a viewer understand the traffic report. In this example, the graphic object 204 is a road shield that identifies that the traffic report is presenting traffic conditions on I-76 westbound. Other graphic objects 204 may also be used in the traffic report, such as objects that represent different types of traffic events, traffic warnings, and so on.

Figure 3:
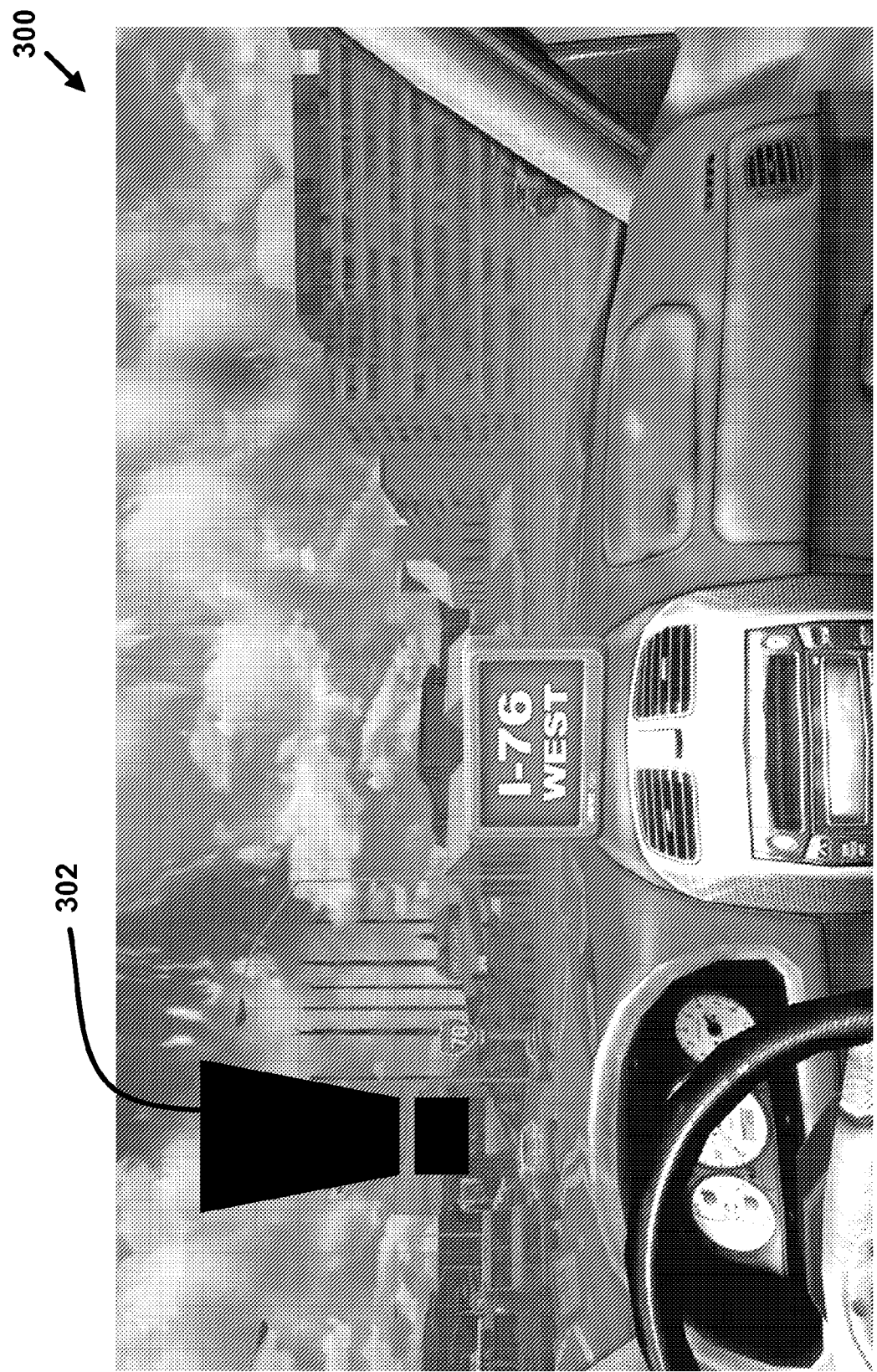
FIG. 3 is a screen shot depicting an object that can be displayed in the in-car view, according to an example.

For example, FIG. 3 is a screen shot 300 depicting an exclamation mark 302 that alerts a viewer of the traffic report to a traffic incident that may cause significant delays. For emphasis, the exclamation mark 302 may be colored red or any other color that alerts a viewer to the traffic conditions.

Returning to FIG. 2, the screen shot 200 also shows a 3D model of a vehicle dashboard 206, which may include a steering wheel, a central column, gauges, a rear view mirror, a windshield, and other equipment found on a vehicle dashboard. The dashboard 206 may be a generic dashboard as shown in FIG. 2. Alternatively, the dashboard 206 may reflect the dashboard design of any vehicle make or model. For example, the dashboard 406 depicted in FIG. 4 is a model of a BMW dashboard.

Figure 5:
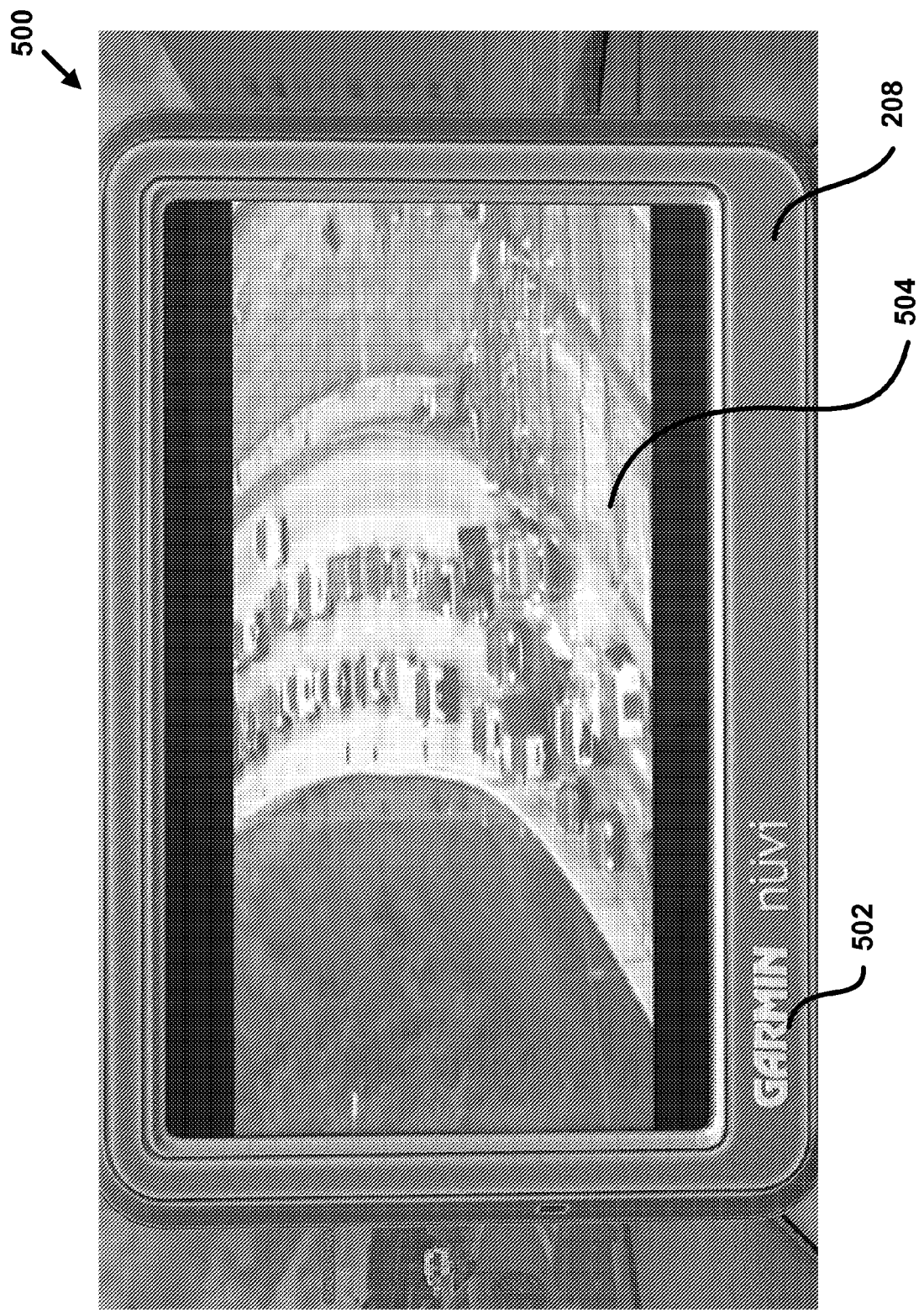
FIG. 5 is a screen shot depicting a screen element, according to an example.

The dashboard 206 also includes a screen element 208. The screen element 208 may represent a navigation system display or any other type of display. The screen element 208 displays information that may assist a viewer in understanding the current traffic conditions. As seen in FIG. 2, the screen element 208 displays roadway information (I-76 WEST) regarding the roadway identified in the traffic report. The screen element 208 can also display speed, travel time, and other text and graphics. As another example, the screen element 208 may display camera video as depicted in FIG. 5. The screen element 208 may also display other information, such as advertisements.

The user, such as a television producer, may select what data is presented on the screen element 208. Additionally, the user may vary the manner in which the data is presented on the screen element 208. For example, the user may use a zoom feature to increase or decrease the size and location of the data presented on the screen element 208.

Figure 4:
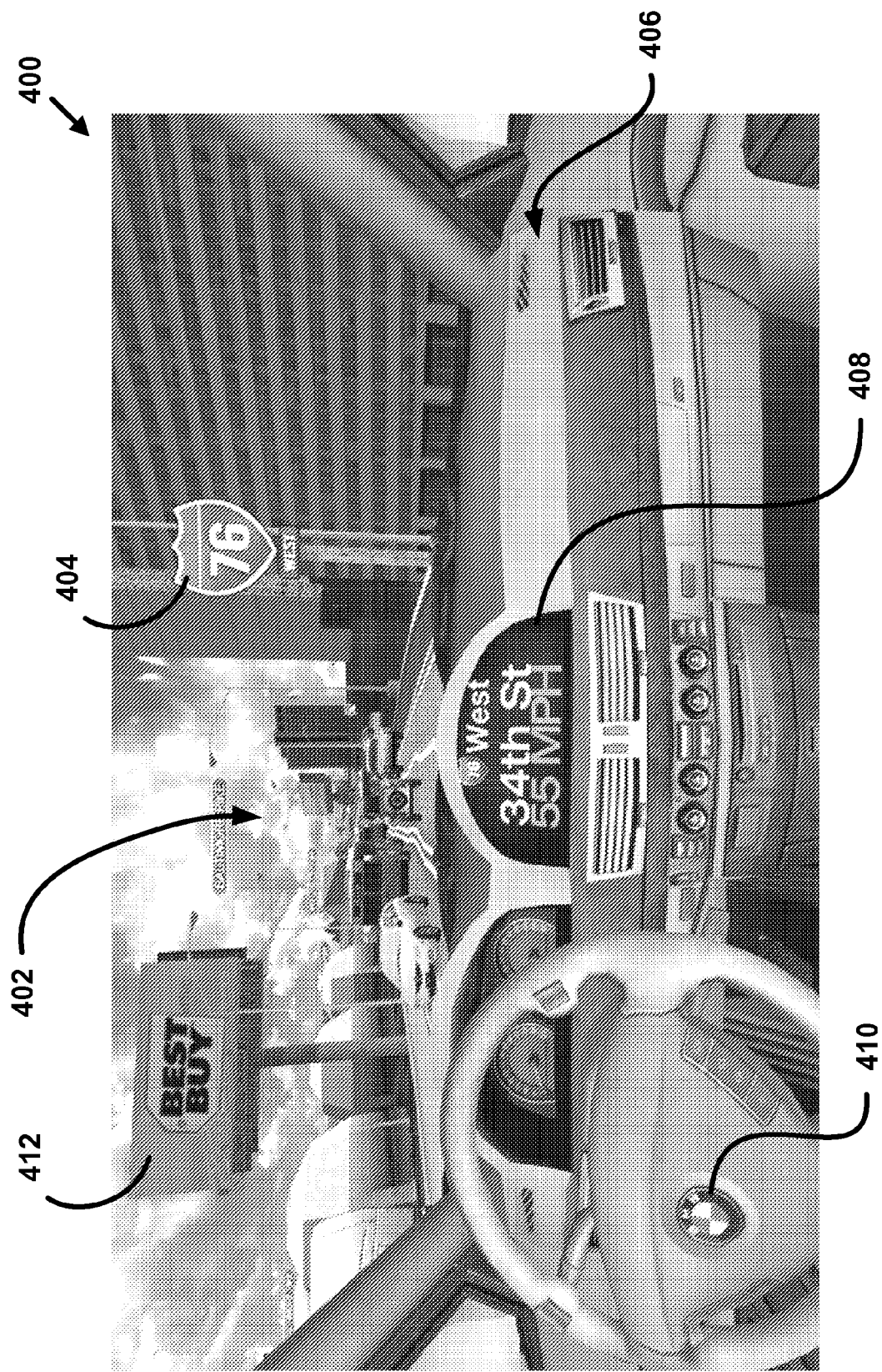
FIG. 4 is a screen shot depicting a forward in-car view of current traffic conditions, according to another example.

FIG. 4 is screen shot 400 depicting another forward in-car view of current traffic conditions. The screen shot 400 is an example of a single image from a traffic report that may be generated by the traffic report application 104 and presented by the television station 106. Similar to the screen shot 200, the screen shot 400 includes artwork modeling current traffic conditions 402, object graphics 404, a dashboard 406, and a screen element 408.

As previously described, the dashboard 406 is a model of a BMW dashboard. In addition to the overall design of the dashboard 406, a steering wheel logo 410 identifies the dashboard 406 as a BMW dashboard. The dashboard design may be used as a sponsorship or other marketing opportunity. A vehicle manufacture may advertise its vehicles by selecting the design of the dashboard artwork to be used in the traffic report. The vehicle manufacture may pay or otherwise compensate the television station 106 or other entity for the product sponsorship opportunity.

Other sponsorship opportunities are available in the in-car view. As shown in FIG. 4, a model of a billboard 412 may be added to the in-car view. In this example, the billboard 412 provides an advertisement for Best Buy. The billboard 412 may or may not exist in the real world. As with the dashboard model, a company may pay or provide other compensation for the right to select the artwork of the billboard 412.

Another sponsorship opportunity is depicted in FIG. 5. FIG. 5 is screen shot 500 depicting a close up view of the screen element 208 depicted in FIG. 2. The screen shot 500 shows that the screen element 208 is model of a navigation system display. A company that sells navigation systems, such as Garmin, may advertise by adding a logo 502 to the artwork of the screen element 208. In this example, Garmin is advertising its Nüvi® product line.

In FIG. 5, the screen element 208 is displaying camera video 504 of current traffic conditions. The camera video 504 depicts a traffic incident that is impacting the traffic conditions of the roadway depicted in the video. As shown in this example, a lane of traffic is blocked causing congestion in the other two lanes.

Figure 6:
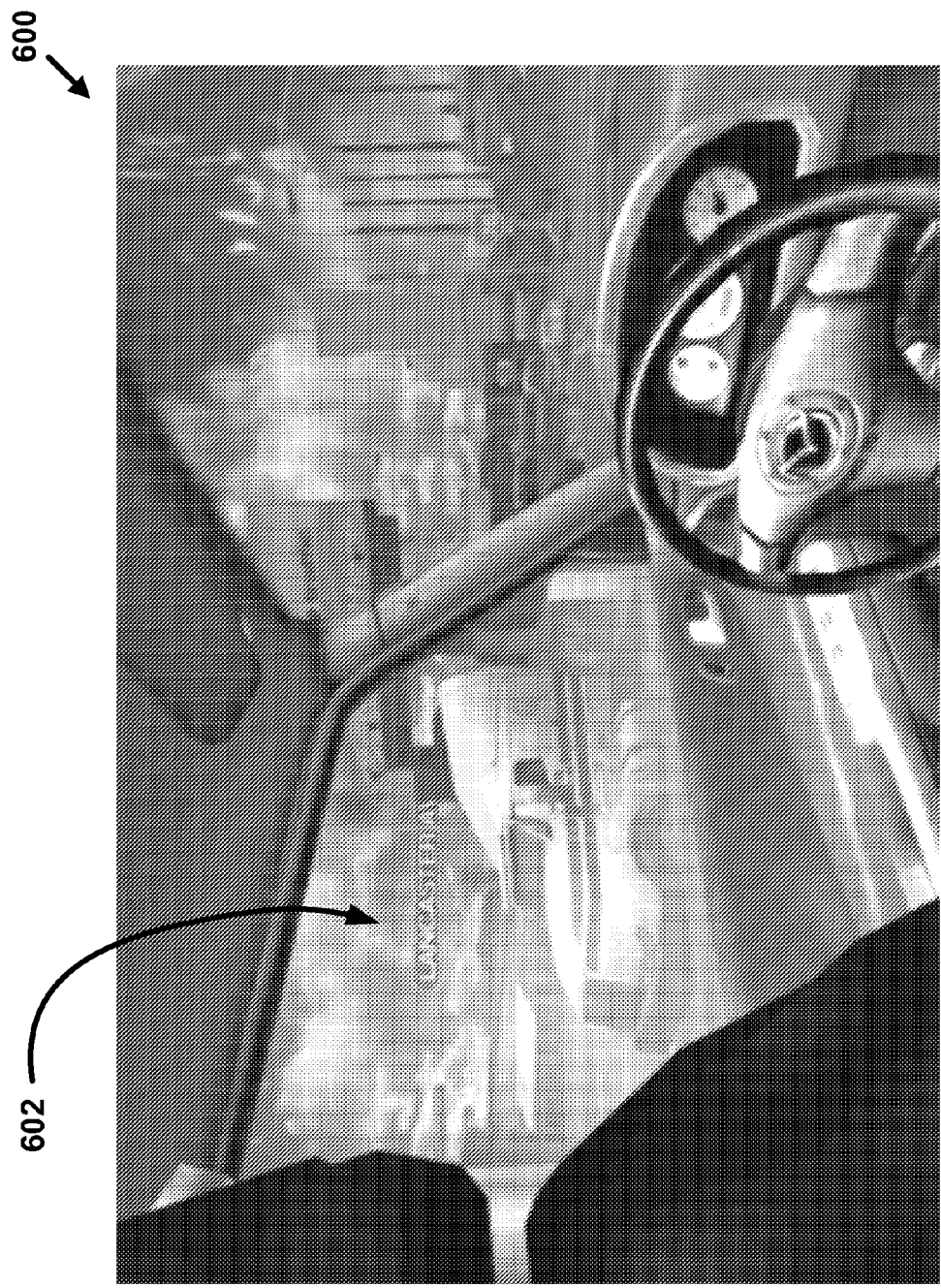
FIG. 6 is a screen shot depicting a side in-car view of current traffic conditions, according to an example.

FIG. 6 is screen shot 600 depicting a side in-car view of current traffic conditions. The screen shot 600 is an example of a single image from a traffic report that may be generated by the traffic report application 104 and presented by the television station 106. The screen shot 600 shows traffic conditions 602 on the opposite side of the road, simulating a driver's view through the driver-side window of a vehicle. In a similar manner, a rear in-car view may be generated simulating a driver's view through a rear view mirror.

The graphics used to represent the traffic conditions 202, 402, 602; the objects 204, 302; the dashboard 206, 406, including the screen element 208; the logos 410, 502; and the billboard 412 are created before their use in a traffic report. An artist may use a graphics application, such as commercially available Autodesk® 3ds Max® (formerly 3D Studio MAX), to create the graphics. Another application, such as Gamebryo, may be used to create a runtime graphics data file (e.g., a .nif file) used by the traffic report application 104 to create the video output sent to the television station 106 or other end user.

The user can select a rundown of views to show in a traffic report. A rundown is a list of routes and associated views that a user would like to present to a viewer of the traffic report. For example, the user may select a section of a highway where an accident occurred. The user may then select a series of views for the accident that simulates a driver's movements while driving on the highway in the area of the accident. In this example, the rundown may include a forward in-car view approaching the accident, followed by a side in-car view while passing the accident, followed by a rear in-car view after passing the accident. When the traffic report is displayed by the television station 106, a web-based application, or a cellular-based application, a viewer of the traffic report experiences the accident as if the viewer was actually at the scene of the accident.

Figure 7:
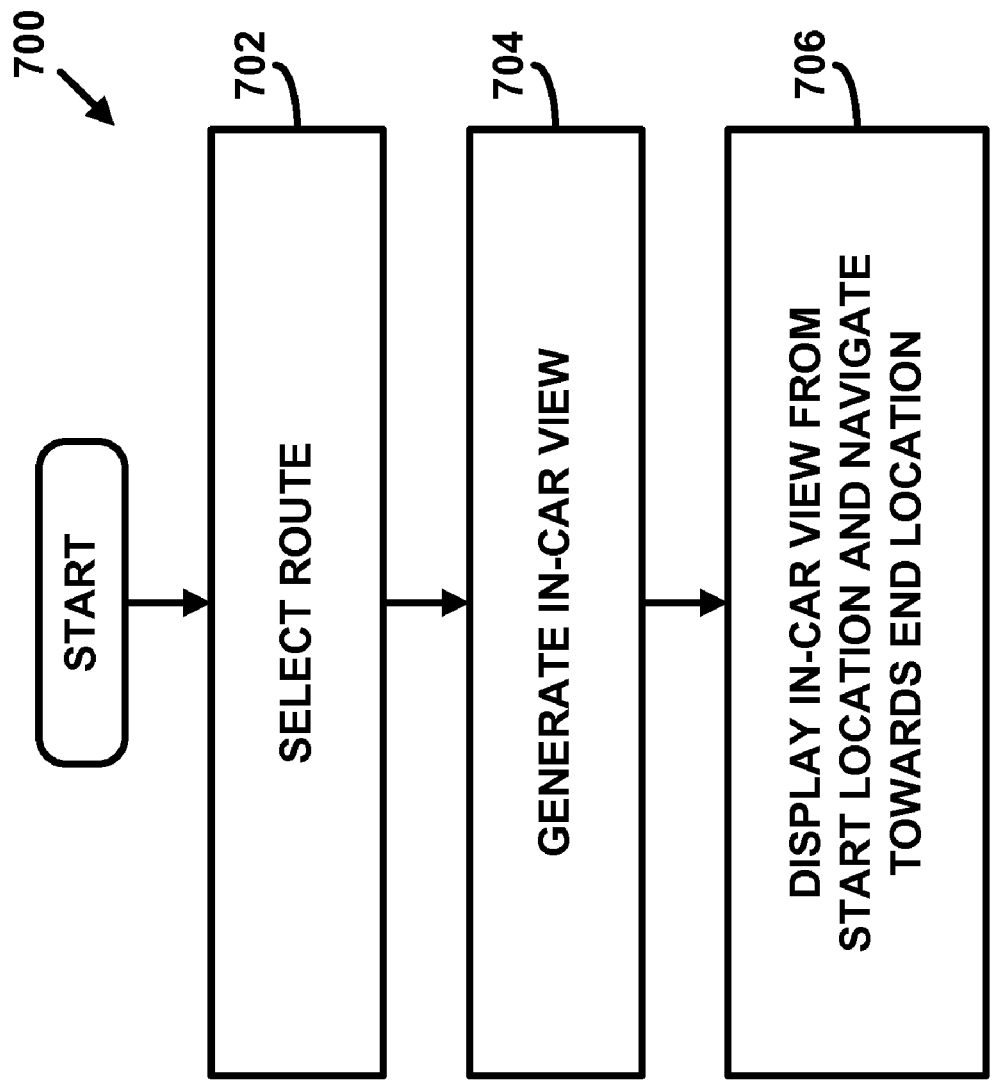
FIG. 7 is a flow chart of a method of displaying an in-car view of current traffic conditions, according to an example.

FIG. 7 is a flow chart of a method 700 of displaying an in-car view of current traffic conditions. At block 702, a user selects a route for the in-car view. The route is a portion of a road network having a start point, an end point, and one or more contiguous road segments located between the start and end points. The routes may be predefined allowing the user to select a route from a list of defined routes. Alternatively, the user can create a route by selecting a start point and an end point represented by data in the geographic database.

At block 704, the method 700 generates an in-car view for the selected route. For each of the road segments in the route, the traffic report application 104 obtains traffic data from the traffic data collection center 102. The traffic report application 104 uses the traffic data to calculate the status of each of the road segments. The traffic report application 104 generates the in-car view by combining the geographical map, the status of each road segment, and the in-car view artwork, including the dashboard.

At block 706, the television station 106, a web-based application, a cellular application, or other system displays the in-car view from the start point, navigating towards the end point. The user can adjust the start point and end points to allow for full or partial coverage of the selected route. The user can also stop the view at a point between the start point and the end point. Additionally, the user can adjust the angle of view between a forward, side, and rear view. As a result, the user has multiple options of showing the traffic conditions on the route.

The in-car view moves from the start point to the end point at a rate proportional to the current conditions of the traffic. For example, if traffic is congested on the route, the in-car view moves more slowly than when traffic is freely flowing. As a result, the traffic report creates a feeling of immersion in the presentation of the traffic data.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method of displaying traffic conditions in a traffic report that includes a visual depiction of a geographical area including a portion of a road network located therein, comprising in combination:
  selecting a route on the portion of the road network, wherein the road network is represented by road segments;
  determining traffic conditions on at least one road segment in the selected route;
  creating computer graphics of a view of the traffic conditions from a vehicle if the vehicle was located on the at least one road segment, wherein the view of the traffic conditions is generated using artwork created with a graphics application prior to generating the view,
  wherein the artwork further includes a selectable dashboard unique to a particular vehicle; and
  displaying the view in a traffic report.

2. The method of claim 1, wherein the view of the traffic conditions is a forward view that depicts what a driver of the vehicle would see if the driver looked in a forward direction.

3. The method of claim 2, wherein the forward view depicts a windshield of the vehicle, wherein computer graphics representing the traffic conditions are visible through the windshield.

4. The method of claim 1, wherein the view is a side view that depicts what a driver of the vehicle would see if the driver looked out a driver's side window of the vehicle.

5. The method of claim 4, wherein the side view depicts traffic conditions on an opposite side of the at least one road segment in the road network.

6. The method of claim 1, wherein the view is a rear view that depicts what a driver of the vehicle would see if the driver looked in a rear view mirror.

7. The method of claim 1, wherein the view of the traffic conditions includes a screen element that displays information regarding the route.

8. The method of claim 7, wherein the information regarding the route includes current traffic speed on the at least one road segment.

9. The method of claim 7, wherein the information regarding the route includes current travel time for the route.

10. The method of claim 1, wherein the view of the traffic conditions includes a screen element that displays camera video.

11. The method of claim 1, wherein the view of the traffic conditions moves at a rate proportional to a speed of traffic on the route.

12. The method of claim 1, further comprising adding at least one advertisement to the view of the traffic conditions.

13. A system for providing a realistic environment for a traffic report that includes a visual depiction of a geographical area including a portion of a road network located therein, comprising:
  a traffic data collection center that receives data regarding traffic conditions on at least one roadway in the portion of the road network and generates a traffic data output; and
  a traffic report application that receives the traffic data output from the traffic data collection center and generates a video output for a traffic report including a view of the traffic conditions from a vehicle driver's perspective, wherein the traffic report application uses an application to create a runtime graphics data file to create the video output,
  wherein the runtime graphics data file further includes a selectable dashboard unique to a particular vehicle.

14. The system of claim 13, wherein the view of the traffic conditions includes a windshield of a vehicle, wherein graphics representing the traffic conditions are visible through the windshield.

15. The system of claim 13, wherein the view of the traffic conditions includes a screen element that displays information about the traffic conditions.

16. The system of claim 13, wherein the view of the traffic conditions moves at a rate proportional to a speed of traffic on the at least one roadway.

17. A method of displaying traffic conditions in a traffic report that includes a visual depiction of a geographical area including a portion of a road network located therein, comprising in combination:
  creating a geographical map of the portion of the road network, wherein the road network is represented by road segments;
  using a graphics application to create a view depicting what a driver sees from a driver's seat in a vehicle located on at least one road segment of the road network;
  obtaining data representing traffic conditions on the at least one road segment; and
  using the geographical map, the view, and the traffic condition data in a visual traffic report,
  wherein the view further includes a selectable dashboard unique to a particular vehicle.

18. The method of claim 17, wherein the view includes a windshield of the vehicle, wherein graphics representing traffic conditions are visible through the windshield.

19. The method of claim 17, wherein the traffic report includes a side view that depicts what the driver would see if the driver looked out a driver's side window of the vehicle, wherein the side view depicts graphics representing traffic conditions on an opposite side of the at least one road segment in the road network.

20. The method of claim 17, wherein the view includes a screen element that displays information about the traffic conditions.

21. The method of claim 17, wherein the view moves at a rate proportional to a speed of traffic on the at least one road segment.

22. The method of claim 17, wherein the view includes at least one advertisement.

* * * * *